United States Patent
Arora et al.

(10) Patent No.: US 9,152,807 B2
(45) Date of Patent: Oct. 6, 2015

(54) METHOD AND APPARATUS FOR PROVIDING AUDIO OR VIDEO CAPTURE FUNCTIONALITY ACCORDING TO A SECURITY POLICY

(71) Applicant: Marvell World Trade Ltd., St. Michael (BB)

(72) Inventors: Gaurav Arora, Cupertino, CA (US); Jinhua Luo, Shanghai (CN); Adil Jagmag, Hollis, NH (US); Geng Yang, Bellevue, WA (US); Pontus Lidman, Saratoga, CA (US)

(73) Assignee: MARVELL WORLD TRADE LTD., St. Michael (BB)

(*) Notice: Subject to any disclaimer, the term of this patent is extended or adjusted under 35 U.S.C. 154(b) by 106 days.

(21) Appl. No.: 13/766,830

(22) Filed: Feb. 14, 2013

(65) Prior Publication Data
US 2013/0291054 A1   Oct. 31, 2013

Related U.S. Application Data

(60) Provisional application No. 61/702,490, filed on Sep. 18, 2012, provisional application No. 61/608,336, filed on Mar. 8, 2012.

(51) Int. Cl.
*G06F 21/62* (2013.01)
*H04N 21/433* (2011.01)
*H04N 21/4627* (2011.01)

(52) U.S. Cl.
CPC ............ *G06F 21/62* (2013.01); *H04N 21/4334* (2013.01); *H04N 21/4627* (2013.01)

(58) Field of Classification Search
CPC ........................................................ G06F 21/62
USPC .............................................................. 726/1
See application file for complete search history.

(56) References Cited

U.S. PATENT DOCUMENTS

| 7,071,995 | B1 | 7/2006 | Horlander | |
|---|---|---|---|---|
| 8,205,239 | B1 * | 6/2012 | Satish | 726/1 |
| 2001/0038744 | A1 * | 11/2001 | Yamada et al. | 386/94 |
| 2002/0046328 | A1 * | 4/2002 | Okada | 711/151 |

(Continued)

FOREIGN PATENT DOCUMENTS

| DE | 102009026137 | 1/2011 |
|---|---|---|
| EP | 1130915 | 9/2001 |

(Continued)

OTHER PUBLICATIONS

International Search Report and Written Opinion dated Aug. 21, 2013 from related/corresponding PCT International Patent Appl. No. PCT/US13/26078 (PCT/IB13/000667) filed Feb. 14, 2013 (9 pages).

*Primary Examiner* — Hadi Armouche
*Assistant Examiner* — Shahriar Zarrineh

(57) ABSTRACT

Systems and methods for providing capture functionality according to a security policy are provided. A request to capture content is received from a requesting application at a capture controller. The request is evaluated based on the security policy of the capture controller. Based on the evaluation, a determination is made as to whether the request is to be granted completely, denied, or granted subject to a constraint. Capture of the requested content is initiated via capture hardware or software if the request is granted completely or granted subject to the constraint.

19 Claims, 7 Drawing Sheets

(56) References Cited

U.S. PATENT DOCUMENTS

| | | | |
|---|---|---|---|
| 2002/0052849 A1* | 5/2002 | McCutchen et al. | 705/59 |
| 2003/0140090 A1* | 7/2003 | Rezvani et al. | 709/203 |
| 2004/0010719 A1* | 1/2004 | Daenen | 713/201 |
| 2004/0015586 A1* | 1/2004 | Hegli et al. | 709/225 |
| 2004/0193606 A1* | 9/2004 | Arai et al. | 707/9 |
| 2005/0125807 A1* | 6/2005 | Brady et al. | 719/318 |
| 2006/0037083 A1* | 2/2006 | Kortum et al. | 726/28 |
| 2006/0149727 A1* | 7/2006 | Viitaharju | 707/5 |
| 2007/0056019 A1* | 3/2007 | Allen et al. | 726/1 |
| 2007/0073673 A1* | 3/2007 | McVeigh et al. | 707/4 |
| 2007/0073694 A1* | 3/2007 | Picault et al. | 707/9 |
| 2007/0253676 A1 | 11/2007 | Roh | |
| 2008/0059645 A1* | 3/2008 | Gregotski et al. | 709/231 |
| 2008/0143875 A1* | 6/2008 | Scott et al. | 348/512 |
| 2011/0004899 A1* | 1/2011 | Medford | 725/32 |
| 2011/0019971 A1 | 1/2011 | Yamane | |
| 2011/0102670 A1* | 5/2011 | Tanji et al. | 348/384.1 |
| 2011/0157470 A1 | 6/2011 | Tsuruga et al. | |
| 2011/0211087 A1* | 9/2011 | Mate et al. | 348/222.1 |
| 2012/0109997 A1* | 5/2012 | Sparks et al. | 707/769 |
| 2012/0167167 A1* | 6/2012 | Kruger et al. | 726/1 |
| 2012/0289147 A1* | 11/2012 | Raleigh et al. | 455/3.06 |
| 2012/0291087 A1* | 11/2012 | Agrawal | 726/1 |
| 2013/0081101 A1* | 3/2013 | Baer et al. | 726/1 |

FOREIGN PATENT DOCUMENTS

| | | |
|---|---|---|
| EP | 1335599 | 8/2003 |
| EP | 1901293 | 3/2008 |

\* cited by examiner

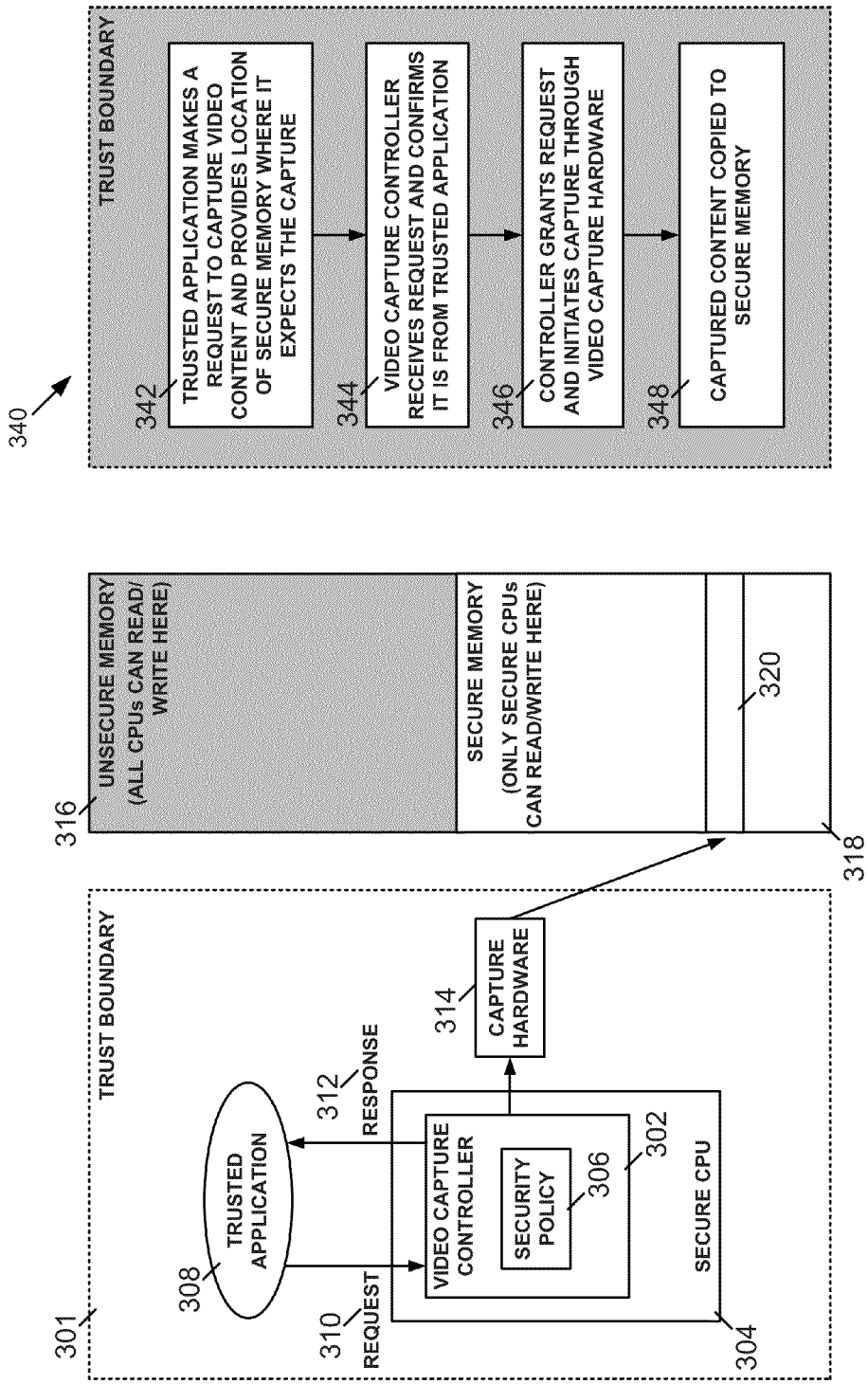

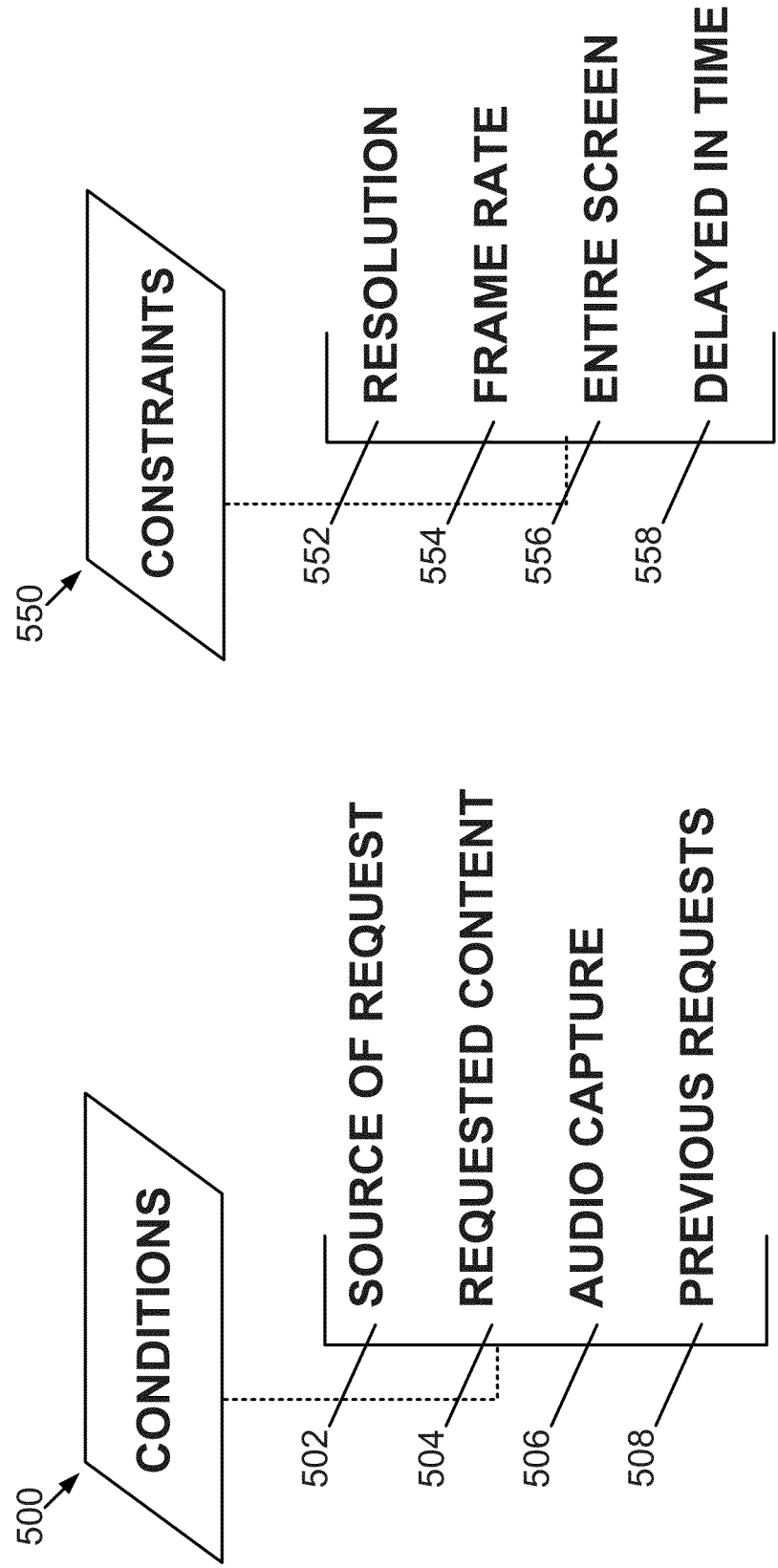

METHOD AND APPARATUS FOR PROVIDING AUDIO OR VIDEO CAPTURE FUNCTIONALITY ACCORDING TO A SECURITY POLICY

CROSS-REFERENCE TO RELATED APPLICATIONS

This disclosure claims priority to U.S. Provisional Patent Application No. 61/608,336, filed on Mar. 8, 2012, and to U.S. Provisional Patent Application No. 61/702,490, filed on Sep. 18, 2012, both of which are incorporated herein by reference in their entireties.

TECHNICAL FIELD

The technology described in this document relates generally to capturing video or audio and more particularly to a capture controller configured to provide capture functionality according to a capture security policy.

BACKGROUND

Televisions (TVs) and set-top boxes (STBs) may include video capture functionality that allows a user to capture frames of video from source video. The functionality may have several uses. For example, for an Internet-connected device, the functionality may be used in a video fingerprinting technology to detect the video content being viewed, so that the device can automatically provide access to applications and features related to the video content. The functionality may also be used on a TV or STB to show frozen frames when the user changes from one channel to another. Numerous other uses for video capture functionality exist (e.g., allowing users to capture frames as image files and share them on a social network, allowing captured frames from multiple source videos to be combined in a video mosaic, etc.).

In providing this functionality, hardware and software is often used to capture the video frames and export them out of a video pipeline. In certain systems, the possibility exists for the functionality to be misused or used for illegitimate purposes (e.g., unauthorized copying of copyrighted video content). For example, an untrusted application may repeatedly capture frames of video, thus circumventing security measures of a secure video pipeline.

SUMMARY

The present disclosure is directed to systems and methods for providing capture functionality according to a security policy. In a method for providing capture functionality according to a security policy, a request to capture content is received from a requesting application at a capture controller. The request is evaluated based on the security policy of the capture controller. Based on the evaluation, a determination is made as to whether the request is to be granted completely, denied, or granted subject to a constraint. Capture of the requested content is initiated via capture hardware or software if the request is granted completely or granted subject to the constraint.

In another example, in a method for providing capture functionality according to a security policy, a request to capture content is received from a requesting application at a capture controller. At the capture controller, it is determined if the request is from a trusted source or an untrusted source. If the request is from the trusted source, the request is granted completely. If the request is from the untrusted source, the request is evaluated based on the security policy of the capture controller, where the evaluation is used to make a determination as to whether the request is to be granted completely, denied, or granted subject to a constraint.

In another example, a system for providing capture functionality according to a security policy includes a capture controller. The capture controller is configured to receive a request to capture content from a requesting application and to evaluate the request based on the security policy. Based on the evaluation, the capture controller makes a determination as to whether the request is to be granted completely, denied, or granted subject to a constraint. If the request is granted completely or granted subject to the constraint, the capture controller initiates capture of the requested content via capture hardware or software.

BRIEF DESCRIPTION OF THE FIGURES

FIG. 3A illustrates example interactions of a video capture controller with a trusted application.

FIG. 3B is a flowchart detailing an example method by which a video capture controller interacts with a trusted application.

FIG. 5A illustrates example conditions of a capture security policy.

FIG. 5B illustrates example constraints of a capture security policy.

DETAILED DESCRIPTION

Figure 1:
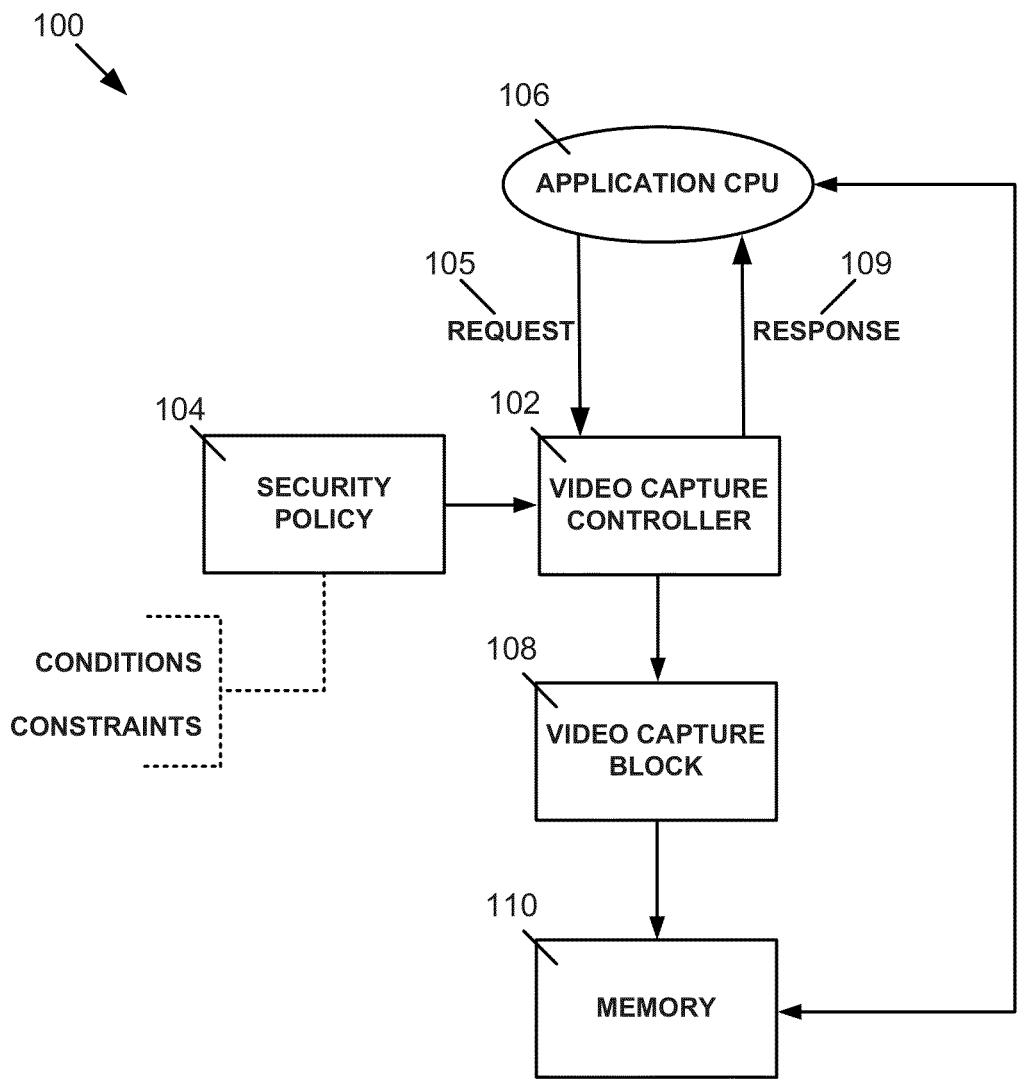
FIG. 1 depicts an example system for capturing video content according to a video capture security policy.

FIG. 1 depicts an example system 100 for capturing video content according to a video capture security policy 104. The system 100 includes a video capture controller 102 configured to enforce the video capture security policy 104. The video capture controller 102 receives a request to capture video content 105 from an application central processing unit (CPU) 106. The request 105 may be for one or more specific frames of video or may request all frames of video within a span of time in a source video. The video capture controller 102 controls access to a video capture block 108 to which it is coupled. The video capture block 108 includes hardware or software used to capture frames of video.

Rather than automatically passing on the request 105 to the video capture block 108, the video capture controller 102 is configured to evaluate the request 105 based on the security policy 104. Based on the evaluation, the video capture controller 102 makes a determination as to whether the request 105 is to be granted completely, denied, or granted subject to constraints. If it is determined that the request is to be granted completely or granted subject to constraints, the video capture controller 102 initiates capture of the requested video content via the video capture block 108, and the requested video content is stored in memory 110 that is accessible to the requesting application CPU 106. The video capture controller 102 may also supply a response 109 to the requesting application CPU 106, where the response indicates whether the request 105 was granted completely, denied, or granted subject to constraints. The response may also be used to inform the requesting application CPU 106 of where the captured video content is stored in the memory 110.

The security policy 104 is used to determine whether the request 105 is to be granted completely, denied, or granted subject to constraints, and also to determine a manner by which the captured content may be constrained. To make these determinations, the security policy 104 includes one or more conditions that are enforced by the video capture controller 102. For example, a condition may cause the video capture controller 102 to make a determination as to whether the request 105 is from a trusted source and to process the request 105 based on that determination. In one example, the request 105 is granted completely if the request 105 is from a trusted source, and if the request 105 is from an untrusted source, the request 105 is evaluated based on other aspects of the security policy 104.

Another example condition of the security policy 104 may cause the video capture controller 102 to evaluate the request 105 based on one or more factors, where the factors may include a digital rights management (DRM) policy of the requested content (e.g., if the content is protected by a certain DRM, such as PlayReady, the video capture may be constrained to sub-SD resolution, whereas if the content is not protected by DRM, then full resolution capture may be allowed), a source of the requested content (e.g., whether the provider of the requested content distributes materials subject to copyright restrictions or not), a source of the request (e.g., whether the request is from a trusted or untrusted source), or a status of the requesting application (e.g., whether the requesting application has been designated as having special privileges regarding video capture). The factors may also be based on audio capture requests related to the requested content (e.g., whether simultaneous audio capture requests have been made by the requesting application or whether the requesting application has requested audio captures for a same period of time in the source video for which video capture requests have been made) or meta-data within the requested content. The factors may further be based on previous video capture requests made by the requesting application, previous video capture requests made by applications other than the requesting application, or repeated fast-forwarding or rewinding of the requested content.

Another example condition of the security policy 104 may cause the video capture controller 102 to evaluate the request 104 based on previous video capture requests received by the video capture controller 102. The evaluation may cause the video capture controller 102 to consider a rate at which the previous video capture requests were made or a number of the previous video capture requests. In an example implementation of this condition, an initial video capture request received by the video capture controller 102 may be granted completely, with the request being fulfilled via a high resolution video capture. As subsequent video capture requests are received by the video capture controller 102, the condition of the security policy 104 may cause the video capture controller 102 to deny the requests or cause the fulfillment of the requests to be delayed in time (i.e., rate controlled) while still being of the same high resolution as the initial video capture. Alternatively, the condition of the security policy 104 may cause the subsequent video capture requests be fulfilled without delay but via a lower resolution video capture. A combination of rate controlled and lower resolution video capture may also be used in processing the subsequent video capture requests.

As noted above, the video capture controller 102 may determine that the request 105 is to be granted subject to constraints. The constraints cause captured video content to be of a lower quality than a source video from which the captured video content was taken. The constraints may, for example, limit a resolution of captured video content, limit a frame rate of the captured video content, limit a size of the captured video content, limit a color fidelity of the captured video content, limit a bit rate of the captured video content, or limit a format of the captured video content.

The example system 100 of FIG. 1 may be part of a television (TV), set top box (STB), or other device that allows playback and capture of video. The security policy 104 may be set as a system configuration or may be configured by an audio-video source application of the TV, STB, or other device. Alternatively, the security policy 104 may be described within the audio-visual content itself (e.g., in metadata that is read by the video capture controller 102). The system 100 allows video capture functionality to be provided while preventing security breaches or allowing unauthorized copying of video content. In one example, the system 100 may be implemented to protect content that is subject to Digital Rights Management (DRM) protection (e.g., Netflix content, encrypted DVDs, etc.). The security policy 104 may thus be used to allow legitimate uses of the video capture controller 102 while simultaneously preventing illegitimate uses.

Although the example system 100 of FIG. 1 is described as providing video capture functionality, with modifications, the system 100 can also be used to provide audio capture functionality according to the security policy 104. Thus, the system 100 may include an audio capture controller that receives a request to capture audio content from a requesting application. The audio capture controller controls access to an audio capture block (e.g., hardware or software used to capture audio) to which it is coupled. The request is evaluated based on a security policy of the audio capture controller, and based on the evaluation, a determination is made as to whether the request is to be granted completely, denied, or granted subject to constraints. The requested audio content is captured via the audio capture block if the request is granted completely or granted subject to constraints.

Figure 2:
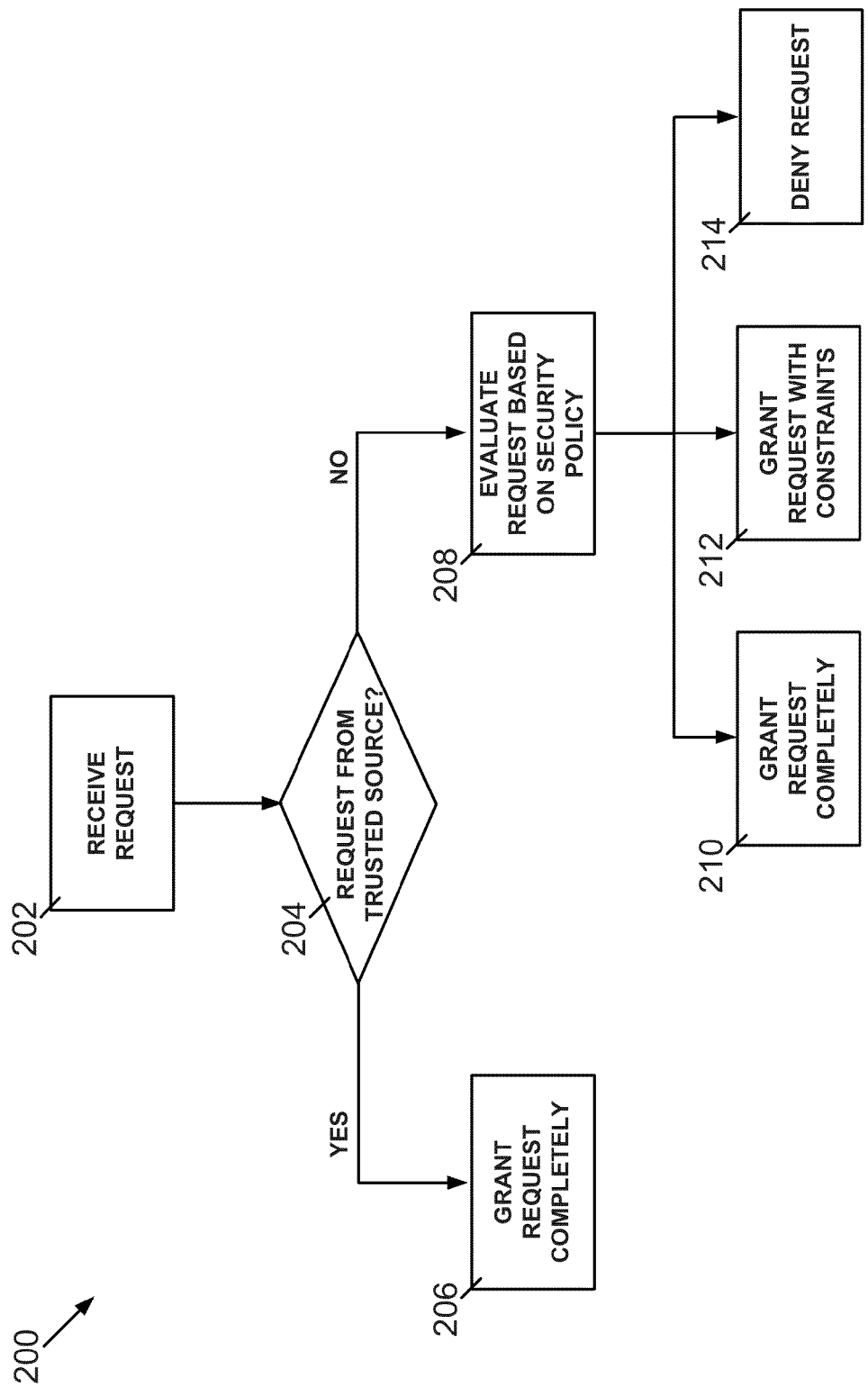
FIG. 2 is a flowchart depicting an example method for capturing content according to a security policy that includes a determination as to whether a capture request is from a trusted source.

FIG. 2 is a flowchart 200 depicting an example method for capturing content according to a security policy that includes a determination as to whether a capture request is from a trusted source. At 202, the request to capture content is received at a capture controller. The requested content may be audio content, video content, or both audio and video content. The capture controller may be an audio capture controller, a video capture controller, or a multipurpose capture controller configured to handle requests related to both audio and video. At 204, the determination is made as to whether the capture request is from a trusted source or an untrusted source. The designation of a source as being trusted or untrusted may be made in any appropriate manner. In one example, the trusted or untrusted designation is made pursuant to a defined trust zone that includes a trust boundary. Requests originating from applications or CPUs executing within the trust boundary are designated as being from trusted sources, while requests originating from applications or CPUs executing outside of the trust boundary are designated as being from untrusted sources. In one example, a trusted application need not be executed on a secure processor but need only be running within the trust boundary (e.g., on a processor that is within the trust boundary) or otherwise be designated as a trusted application.

In another example, the trusted or untrusted designation is made based on whether the request originates from a secure processor. In this example, certain applications can be marked as being "secure," such that the certain applications are permitted to run on a secure processor. Alternatively, a certain signature of an application or other characteristic of the application may enable the application to be executed on a secure processor. In the above-described examples, the capture controller and capture block may be implemented within a trust zone or on a secure processor. FIGS. 3 and 4, described in detail below, illustrate interactions of the capture controller with trusted and untrusted applications, respectively.

If the request is determined to be from a trusted source, at 206, the request is granted completely. If the request is granted completely, the request is granted without constraints and according to the terms of the request. For example, if the request is for a high resolution or high data rate capture, the request is granted at the high resolution or the high data rate. Further, if the capture controller determines that the request is from a trusted source, such that the request is to be granted completely, the capture controller may instruct a capture block to grant the request without any consideration as to whether prior requests have been fulfilled. Thus, a trusted source's repeated requests for high resolution captures may be granted without consideration as to whether the repeated requests are for a legitimate or illegitimate use. Requests originating from trusted sources may thus utilize the capture controller as often as desired and at the highest quality desired.

If the request is determined to be from an untrusted source, at 208, the capture controller evaluates the request based on a security policy of the capture controller. Based on the evaluation, the capture controller makes one of three determinations: (1) at 210, the capture controller may determine that the request is to be granted completely; (2) at 212, the capture controller may determine that the request is to be granted with constraints; or (3) at 214, the capture controller may determine that the request is to be denied. As described above with respect to FIG. 1, the security policy may be based on a DRM policy of the requested content, a source of the requested content, audio capture requests related to the requested content, and previous capture requests made by the requesting application, among other factors. The constraints may be used to limit a resolution of captured video content, limit a frame rate of the captured video content, limit a spatial size of the captured video content, or limit the captured video content in other ways.

In the example flowchart 200 of FIG. 2, the determination as to whether the request is from a trusted or an untrusted source is depicted as being a determination that is made separate from the determinations made pursuant to the security policy of the capture controller. However, the determination as to whether the request is from a trusted source may be implemented as a condition within the security policy. In enforcing the security policy, the capture controller may make the determination as to whether the request is from a trusted source first and evaluate the request based on other aspects of the security policy only if the capture controller determines that the request is from an untrusted source.

FIG. 3A illustrates example interactions of a video capture controller 302 with a trusted application 308. In the example of FIG. 3A, both the video capture controller 302 and the trusted application 308 are executed within a trust boundary 301. Further, the video capture controller 302 is being executed on a secure CPU 304. In this example, with the video capture controller 302 being executed on the secure CPU 304, only known, trusted code may be run on the secure CPU 304. Communication with the secure CPU 304 may be via message box. In another example, the trusted application 308 may be executed on the secure CPU 304 or a different secure CPU.

In the example of FIG. 3A, the video capture controller 302 receives a request 310 from the trusted application 308 to capture video content. As dictated by a security policy 306 of the video capture controller 302, because the request 310 is from a trusted application, the request 310 is granted fully (e.g., at a highest resolution or frame rate and without consideration of a number or rate of previous video capture requests). Consequently, the video capture controller 302 instructs video capture hardware 314, which is also being executed within the trust boundary 301, to capture the requested content and store the content at a particular location 320 in secure memory 318. The secure memory 318 is memory that can only be accessed by secure CPUs and applications and by CPUs and applications executed within the trust boundary 301. By contrast, unsecure memory 316 can be accessed by all CPUs and all applications. The video capture controller 302 may also provide a response 312 to the requesting application 308, informing the requesting application 308 that the request 310 has been fulfilled. The requesting application 312 may thereafter access the particular location 320 in the secure memory 318 to retrieve the captured content.

The system of FIG. 3A may be implemented using various types of hardware. For example, the system may be implemented using a system on a chip (SOC) integrated circuit or other integrated circuit technology, where the video capture controller 302, secure CPU 304, capture hardware 314, and trusted application 308 are executed on a SOC. The components on the SOC interact with the memory 316, 318 that may or may not be a part of the single integrated circuit.

FIG. 3B is a flowchart 340 detailing an example method by which a video capture controller interacts with a trusted application. At 342, the trusted application makes a request to capture video content and provides a location of secure memory where the trusted application expects to retrieve the capture. At 344, the video capture controller receives the request and confirms that the request is from a trusted application. At 346, after confirming the requesting application's trusted status, the video capture controller grants the request and initiates capture of the request through video capture hardware. As noted above, the request should be granted completely, due the trusted status of the requesting application. At 348, the captured video content is copied to the secure memory, where the content can be retrieved by the requesting application.

Figure 4A:
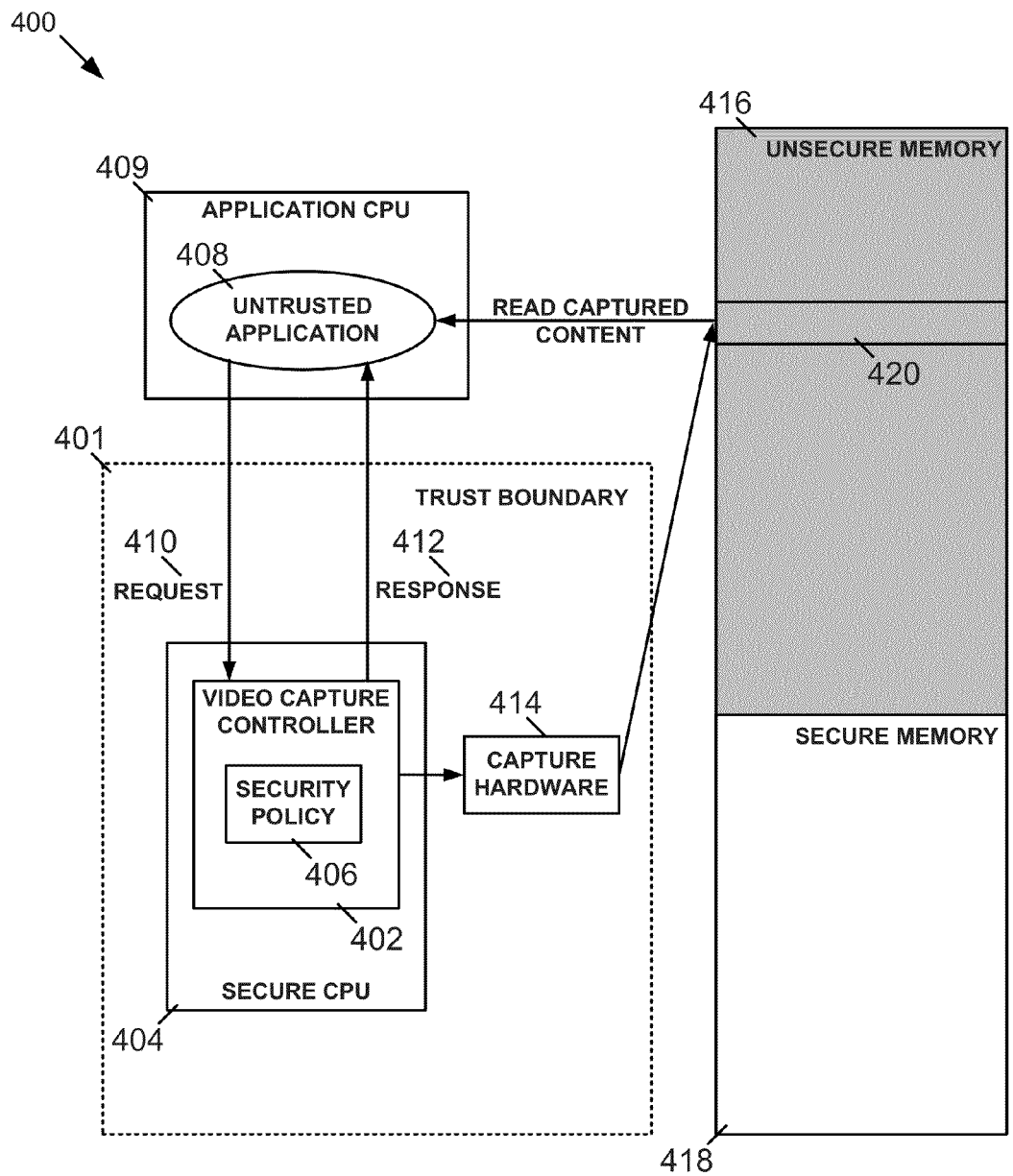
FIG. 4A illustrates example interactions of a video capture controller with an untrusted application being executed upon an application CPU outside of a trust boundary.

FIG. 4A illustrates example interactions of a video capture controller 402 with an untrusted application 408 being executed upon an application CPU outside of a trust boundary 401. In the example of FIG. 4A, the video capture controller 402 is being executed on a secure CPU 404 within the trust boundary 401. The video capture controller 402 receives a request 410 from the untrusted application 408 to capture video content. As dictated by a security policy 406 of the video capture controller 402, because the request 410 is from an untrusted application, the request is evaluated based on the security policy 406 (i.e., the request is not necessarily granted completely, as illustrated in the example of FIGS. 3A and 3B) to determine if the request should be granted completely, denied, or granted subject to constraints. If the request is to be granted completely or granted subject to constraints, the video capture controller 402 instructs video capture hardware 414, which is being executed within the trust boundary 401, to capture the requested content and store the content at a particular location 420 in unsecure memory 416. As noted above with respect to FIG. 3A, the unsecure memory 416 is accessible to all CPUs and all applications, regardless of whether the CPU or application is secure. By contrast, secure memory 418 is memory that can only be accessed by secure CPUs and applications and by CPUs or applications that are within the trust boundary 401. The video capture controller 402 may also provide a response 412 to the requesting application 408, informing the requesting application as to whether the request 410 was granted completely, denied, or granted subject to constraints. The requesting application 408 may thereafter access the particular location 420 in the unsecure memory 416 to retrieve the captured content.

The system of FIG. 4A may be implemented using various types of hardware. For example, the system may be implemented using a system on a chip (SOC) integrated circuit or other integrated circuit technology. For example, the video capture controller 402, secure CPU 404, capture hardware 414, and application CPU 409 may be executed on a SOC. The components on the SOC interact with the memory 416, 418 that may or may not be a part of the SOC.

Figure 4B:
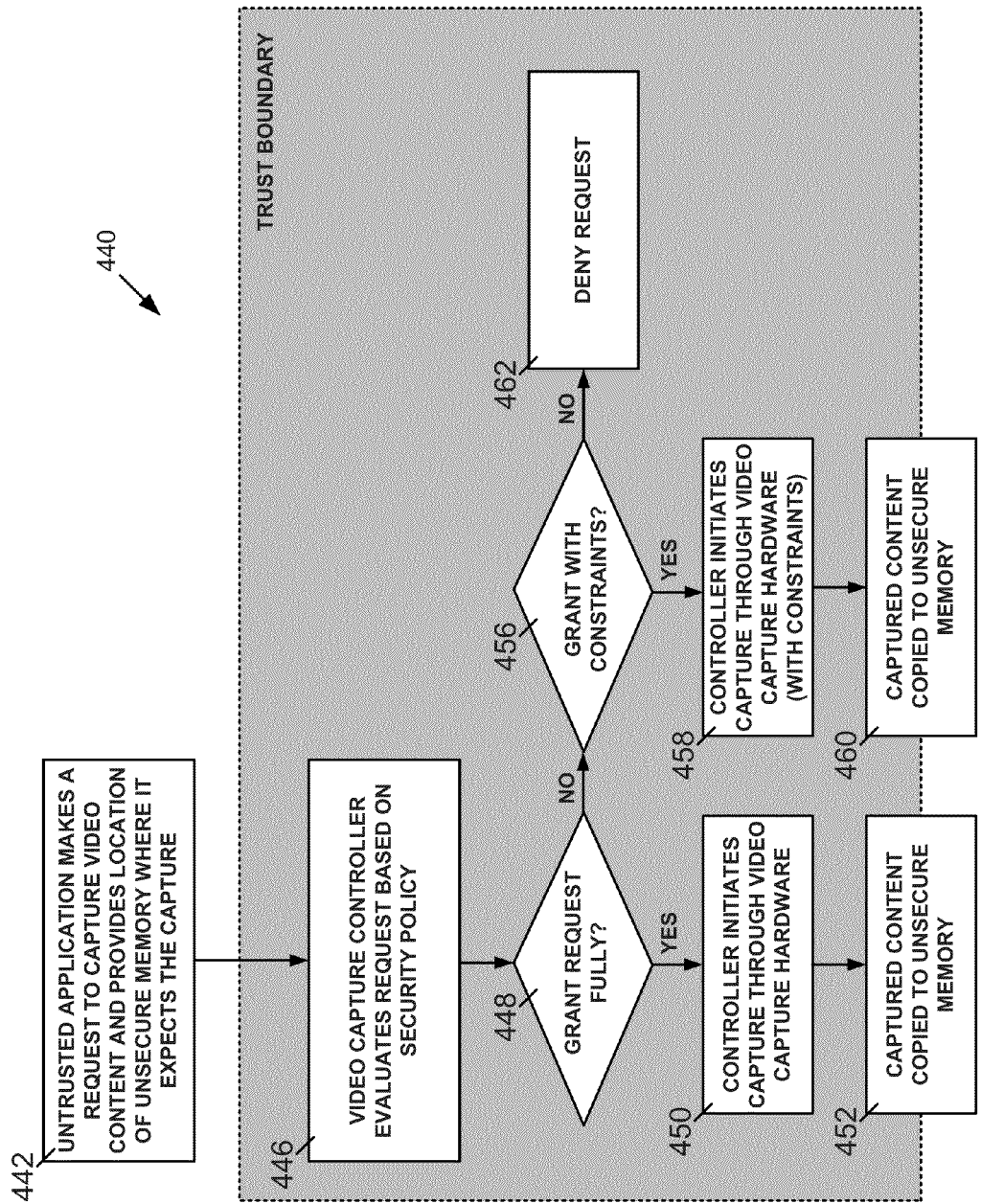
FIG. 4B is a flowchart detailing an example method by which a video capture controller interacts with an untrusted application.

FIG. 4B is a flowchart 440 detailing an example method by which a video capture controller interacts with an untrusted application. At 442, the untrusted application makes a request to capture video content and provides a location in unsecure memory where the untrusted application expects the video capture to be copied. At 446, because the requesting application is an untrusted application, the video capture controller evaluates the request based on a security policy. At 448, the video capture controller makes a determination as to whether the request should be granted fully. If the request is to be granted fully, at 450, the video capture controller initiates capture of the requested content through video capture hardware. At 452, the captured content is copied to unsecure memory, where the content can be accessed by the requesting application.

If the request is not to be granted fully, at 456, a determination is made as to whether the request should be granted with constraints. If the request is to be granted with constraints, at 458, the video capture controller initiates capture through video capture hardware, subject to the constraints. At 460, the captured content is copied to unsecure memory, where the content can be accessed by the requesting application. If the request is not to be granted with constraints, at 462, the request is denied.

Although the systems of FIGS. 3A and 4A utilize a video capture controller to provide video capture functionality, the systems can similarly be used to provide audio capture functionality through the use of an audio capture controller. The audio capture controller can be used in a similar manner to the video capture controller to enforce a security policy and to store the requested content to unsecure or secure memory, as needed.

FIGS. 5A and 5B depict conditions 500 and constraints 550 that may be used in a security policy of a capture controller configured to capture content according to the security policy. As described above with respect to the preceding figures, a system for capturing content may include a capture controller configured to enforce a security policy. Requests to capture content made by requesting applications are evaluated based on the security policy of the capture controller, and based on the evaluation, the request is granted completely, denied, or granted subject to constraints. Thus, two aspects of the security policy include (1) conditions of the security policy (i.e., factors that are considered in determining whether to grant the request completely, deny the request, or grant the request subject to constraints) and (2) the constraints that may be applied to the captured content in situations where the request for the capture is granted subject to constraints.

At 500, FIG. 5A illustrates example conditions of the capture security policy. At 502, a source of the request for the capture may be one factor used in evaluating the request, pursuant to the security policy. As illustrated in the example flowchart 200 of FIG. 2, the capture controller may determine whether the request originates from a trusted source or an untrusted source as part of its evaluation of the request. The security policy may be configured to consider the source of the request in other ways (e.g., whether the source of the request has been designated as having special privileges with respect to audio or video capture). At 504, the content that is requested may be considered in evaluating the request pursuant to the security policy. For example, certain requested content may be subject to DRM restrictions, while other requested content may be freely transferable. As another example, the requested content may include meta-data that may be used in determining whether to grant the request, deny the request, or grant the request with constraints. At 506, audio capture requests related to requested video content may be considered in evaluating the request pursuant to the security policy. For example, if an audio capture request is made at a same or similar point in time (e.g., simultaneously) as the video capture request or if the request is for audio at a same or similar point in time in the source video for which the video is requested, then the security policy may cause the capture controller to instruct the capture hardware to provide low quality frame captures. If no audio captures are being requested, alternatively, the capture hardware may be instructed to provide high quality frame captures.

At 508, previous video capture requests may be considered in evaluating the request pursuant to the security policy. In one example illustrating an implementation of this condition, an initial video capture request received by the video capture controller is granted completely, with the request being fulfilled via a high resolution video capture. As subsequent video capture requests are received by the video capture controller, the condition of the security policy may cause the video capture controller to deny the requests or cause the fulfillment of the requests to be delayed in time (i.e., rate controlled) while still being of the same high resolution as the initial video capture. Alternatively, the condition of the security policy may cause the subsequent video capture requests to be fulfilled without delay but via a lower resolution video capture. A combination of rate controlled and lower resolution video capture may also be used in processing the subsequent video capture requests. A threshold value may be associated with the subsequent video capture requests, where the threshold value is a rate of requests or a number of requests. When the subsequent video capture requests reach the threshold value, the requests are denied, delayed in time, or fulfilled at a lower resolution, as described above.

In evaluating the request pursuant to previous video capture requests made to the video capture controller, the video capture controller may maintain a hysteresis curve that is used to track the requests. Using the hysteresis curve, short bursts of video capture of high quality may be allowed with quality quickly degrading when a threshold is passed, where the threshold is a rate of video capture requests or a number of video capture requests. Further, using the hysteresis curve, quality may improve when the rate of video capture requests is reduced.

At 550, FIG. 5B illustrates example constraints of the capture security policy. At 552, an example constraint is used to limit a resolution of captured video content. Thus, although a request for video capture may request a high resolution capture, the video capture controller, operating pursuant to the video capture security policy, may instead constrain the resolution of the capture. Similarly, at 554, another example constraint is used to limit a frame rate of the captured video content. This constraint may be used, for example, in situations where a requesting application requests multiple consecutive frames of video content of a source video. Limiting the frame rate of the captures may thus prevent all requested frames from being delivered. At 556, another constraint may be used to limit a size of a provided video capture, such that the provided video capture does not include an entire screen of the source video. At 558, another example constraint may be used to introduce a time-delay in providing the requested capture to the requesting application. Using this constraint, the requested capture may be provided to the requesting application, but at a later time, such that the requesting application may be prevented from using the capture for illegitimate purposes.

Other constraints may be part of the capture security policy. For example, constraints may limit a color fidelity of captured video content, limit a bit rate of the captured content, or limit a format of the captured content. The capture security policy may include any one of the constraints 550 of FIG. 5B or the other constraints or may include a combination of them (e.g., size-limited captures of lower resolution).

Figure 6:
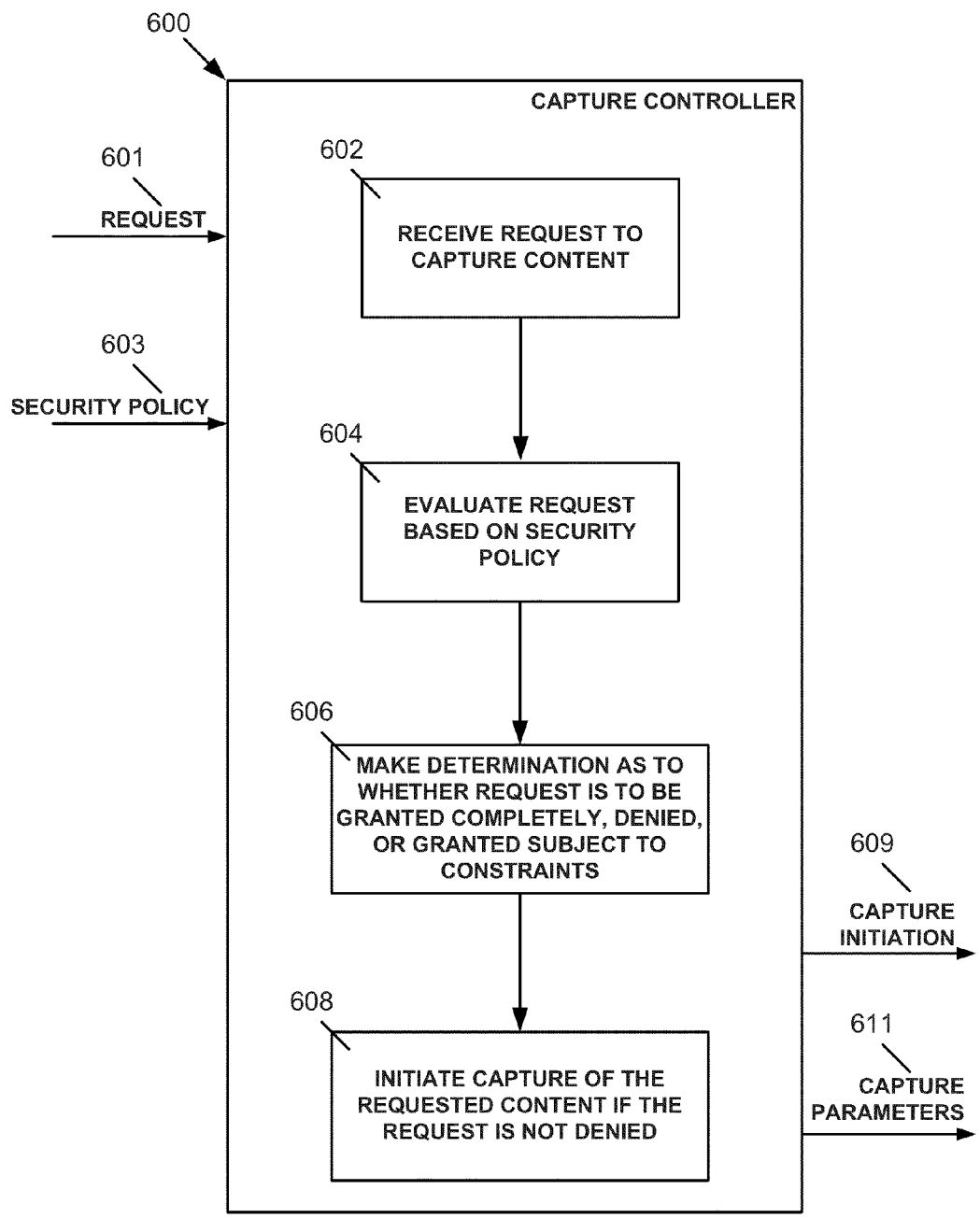
FIG. 6 is a flowchart illustrating a method for providing capture functionality according to a security policy.

FIG. 6 is a flowchart 600 illustrating a method for providing capture functionality according to a security policy. At 602, a capture controller receives a request 601 to capture content from a requesting application. The request 601 may be for one or more discrete frames of a source video or may be for multiple consecutive frames of a source video (i.e., a span of video content), for example. At 604, the capture controller evaluates the request 601 based on a security policy 603. The security policy 603 includes conditions (i.e., factors that are evaluated in determining how to process the request 601) and constraints (i.e., ways in which the captured content may delivered at a lower quality than the source from which the captured content was taken). At 606, based on the evaluation, the capture controller makes a determination as to whether the request 601 is to be granted completely, denied, or granted subject to constraints. At 608, the capture controller initiates capture of the requested content via capture hardware or software if the request 601 is not denied. Initiating the capture may include sending a capture initiation command 609 and capture parameters 611 to the capture hardware or software. The capture initiation command 609 instructs the capture hardware or software to initiate capture of the requested content, and the capture parameters 611 may instruct the capture hardware or software to limit the capture according to the constraints of the capture security policy 603. The capture parameters 611 may further instruct the capture hardware or software as to where the captured content should be stored (e.g., at a particular address in secure memory or unsecure memory).

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method for providing capture functionality according to a security policy, the method comprising:
   receiving a request to capture content from a requesting application at a capture controller;
   evaluating the request based on a security policy of the capture controller, the security policy being based on previous capture requests received by the capture controller, wherein a rate at which the previous capture requests were made or a number of the previous capture requests is considered in the security policy;
   based on the evaluation, making a determination as to whether the request is to be granted completely, wherein it is determined that the request is to be granted completely prior to reaching a threshold value associated with the previous capture requests;
   based on the evaluation, making a determination as to whether the request is to be granted subject to a constraint, wherein it is determined that the request is to be granted subject to the constraint after reaching the threshold value;
   capturing the requested content in a high-quality capture using capture hardware or software based on a determination that the request is to be granted completely;

capturing the requested content in a low-quality capture using the capture hardware or software based on a determination that the request is to be granted subject to the constraint;

storing captured content on a non-transitory computer-readable storage medium that is accessible by the requesting application, wherein based on the determination that the request is to be granted subject to the constraint, the constraint is applied (i) while the capturing is occurring, and (ii) prior to the storing of the captured content, the constraint causing the captured content to be different from a source from which the captured content is taken.

2. The method of claim 1, further comprising:

granting the request subject to the constraint, wherein the constraint causes the captured content to be of a lower quality than the source from which the captured content is taken.

3. The method of claim 1, further comprising:

evaluating the request based on the security policy, wherein the security policy causes the capture controller to make a determination as to whether the request is from a trusted source or an untrusted source, wherein the trusted source is an application or processor being executed within a trust boundary that includes the capture controller, and wherein the untrusted source is an application or processor being executed outside of the trust boundary;

granting the request completely if the capture controller makes a determination that the request is from a trusted source; and evaluating the request based on other aspects of the security policy if the capture controller makes a determination that the request is from an untrusted source.

4. The method of claim 1, further comprising:

receiving the request to capture the content, wherein the requested content is audio content, and wherein the capture controller is an audio capture controller.

5. The method of claim 1, further comprising:

receiving the request to capture the content, wherein the requested content is video content, and wherein the capture controller is a video capture controller.

6. The method of claim 5, further comprising:

granting the request subject to the constraint, wherein the constraint limits a resolution of the captured content, limits a frame rate of the captured content, limits a size of the captured content, limits a color fidelity of the captured content, limits a bit rate of the captured content, or limits a format of the captured content.

7. The method of claim 5, further comprising:

evaluating the request based on the security policy of the video capture controller, wherein the security policy is based on a digital rights management (DRM) policy of the requested content, a source of the requested content, a source of the request, a status of the requesting application, audio capture requests related to the requested content, meta-data within the requested content, previous video capture requests made by the requesting application, previous video capture requests made by applications other than the requesting application, or repeated fast-forwarding or rewinding of the requested content.

8. A method for providing capture functionality according to a security policy, the method comprising:

receiving a request to capture content from a requesting application at a capture controller;

making a determination at the controller as to whether the request is from a trusted source or an untrusted source, wherein the trusted source is an application or processor being executed within a trust boundary that includes the capture controller, and wherein the untrusted source is an application or processor being executed outside of the trust boundary;

based on a determination that the request is from the trusted source, granting the request completely;

based on a determination that the request is from the untrusted source, evaluating the request based on a security policy of the capture controller, the security policy being based on previous capture requests received by the capture controller, wherein a rate at which the previous capture requests were made or a number of the previous capture requests is considered in the security policy, and the evaluation being used to (i) make a determination as to whether the request is to be granted completely, wherein it is determined that the request is to be granted completely prior to reaching a threshold value associated with the previous capture requests, and (ii) make a determination as to whether the request is to be granted subject to a constraint, wherein it is determined that the request is to be granted subject to the constraint after reaching the threshold value; and capturing the requested content in a high-quality capture using capture hardware or software based on a determination that the request is to be granted completely;

capturing the requested content in a low-quality capture using the capture hardware or software based on a determination that the request is to be granted subject to the constraint;

storing captured content on a non-transitory computer-readable storage medium that is accessible by the requesting application, wherein based on the determination that the request is to be granted subject to the constraint, the constraint is applied (i) while the capturing is occurring, and (ii) prior to the storing of the captured content, the constraint causing the captured content to be different from a source from which the captured content is taken.

9. A system for providing capture functionality according to a security policy, the system comprising:

a non-transitory computer-readable storage medium; and a capture controller, the capture controller being configured to:

receive a request to capture content from a requesting application, evaluate the request based on the security policy, the security policy being based on previous capture requests received by the capture controller, wherein a rate at which the previous capture requests were made or a number of the previous capture requests is considered in the security policy, based on the evaluation, make a determination as to whether the request is to be granted completely, wherein it is determined that the request is to be granted completely prior to reaching a threshold value associated with the previous capture requests, based on the evaluation, make a determination as to whether the request is to be granted subject to a constraint, wherein it is determined that the request is to be granted subject to the constraint after reaching the threshold value, capture the requested content in a high-quality capture using capture hardware or software based on a determination that the request is to be granted completely;

capture the requested content in a low-quality capture using the capture hardware or software based on a determination that the request is to be granted subject to the constraint;

store captured content on the non-transitory computer-readable storage medium that is accessible by the requesting application, wherein based on the determination that the request is to be granted subject to the constraint, the constraint is applied (i) while the capturing is occurring, and (ii) prior to the storing of the captured content, the constraint causing the captured content to be different from a source from which the captured content is taken.

10. The system of claim 9, wherein the constraint causes the captured content to be of a lower quality than the source from which the captured content is taken.

11. The system of claim 9, wherein the capture controller is configured to:

evaluate the request based on the security policy, wherein the security policy causes the capture controller to make a determination as to whether the request is from a trusted source or an untrusted source, wherein the trusted source is an application or processor being executed within a trust boundary that includes the capture controller, and wherein the untrusted source is an application or processor being executed outside of the trust boundary;

grant the request completely if the capture controller makes a determination that the request is from a trusted source; and evaluate the request based on other aspects of the security policy if the capture controller makes a determination that the request is from an untrusted source.

12. The system of claim 9, wherein the threshold value is a particular rate at which the previous capture requests were made or a particular number of the previous capture requests.

13. The system of claim 9, wherein the requested content is audio content, and wherein the capture controller is an audio capture controller.

14. The system of claim 9, wherein the requested content is video content, and wherein the capture controller is a video capture controller.

15. The system of claim 14, wherein the constraint limits a resolution of the captured content, limits a frame rate of the captured content, limits a size of the captured content, limits a color fidelity of the captured content, limits a bit rate of the captured content, or limits a format of the captured content.

16. The system of claim 14, wherein the security policy is based on a digital rights management (DRM) policy of the requested content, a source of the requested content, a source of the request, a status of the requesting application, audio capture requests related to the requested content, meta-data within the requested content, previous video capture requests made by the requesting application, previous video capture requests made by applications other than the requesting application, or repeated fast-forwarding or rewinding of the requested content.

17. The method of claim 3, wherein the application or processor being executed within the trust boundary has access to a portion of the non-transitory computer-readable storage medium that is secure, and wherein the application or processor being executed outside of the trust boundary does not have access to the portion of the non-transitory computer-readable storage medium that is secure.

18. The method of claim 8, wherein the application or processor being executed within the trust boundary has access to a portion of the non-transitory computer-readable storage medium that is secure, and wherein the application or processor being executed outside of the trust boundary does not have access to the portion of the non-transitory computer-readable storage medium that is secure.

19. The system of claim 11, wherein the application or processor being executed within the trust boundary has access to a portion of the non-transitory computer-readable storage medium that is secure, and wherein the application or processor being executed outside of the trust boundary does not have access to the portion of the non-transitory computer-readable storage medium that is secure.

* * * * *